United States Patent
Hwang et al.

(10) Patent No.: US 7,715,016 B2
(45) Date of Patent: May 11, 2010

(54) IMAGE INVARIANT OPTICAL SPECKLE CAPTURING DEVICE AND METHOD

(75) Inventors: Yi-Yuh Hwang, Taoyuan (TW); Ming Chen, Tao-Yuan (TW); Shin-I Ma, Tao-Yuan (TW); Chin-Der Hwang, Jhubei (TW); Mau-Ran Wang, Taipei (TW); Wen-Chen Huang, Taipei (TW)

(73) Assignee: Chung Shan Institute of Science and Technology, Taoyuan County (TW)

( * ) Notice: Subject to any disclaimer, the term of this patent is extended or adjusted under 35 U.S.C. 154(b) by 179 days.

(21) Appl. No.: 11/998,406

(22) Filed: Nov. 30, 2007

(65) Prior Publication Data
US 2008/0088853 A1 Apr. 17, 2008

Related U.S. Application Data

(63) Continuation-in-part of application No. 11/300,488, filed on Dec. 15, 2005, now abandoned.

(51) Int. Cl.
*G01B 11/02* (2006.01)
*G06F 3/033* (2006.01)
*G09G 5/08* (2006.01)

(52) U.S. Cl. .................................... 356/498; 345/166

(58) Field of Classification Search ............... 356/496, 356/498, 499, 521; 345/163, 166
See application file for complete search history.

(56) References Cited

U.S. PATENT DOCUMENTS

| 4,794,384 A | 12/1988 | Jackson |
| 6,256,016 B1 | 7/2001 | Piot et al. |
| 6,424,407 B1 | 7/2002 | Kinrot et al. |
| 6,642,506 B1 | 11/2003 | Nahum et al. |
| 6,934,037 B2 | 8/2005 | DePue et al. |
| 2005/0024623 A1 | 2/2005 | Xie et al. |
| 2005/0026624 A1 | 2/2005 | Gandhi et al. |

FOREIGN PATENT DOCUMENTS

| JP | 01-161521 | 6/1989 |
| JP | 2002-013948 | 1/2002 |
| JP | 2005-050349 | 2/2005 |
| WO | WO-2004/075040 | 9/2004 |

*Primary Examiner*—Michael A Lyons
(74) *Attorney, Agent, or Firm*—Rabin & Berdo, P.C.

(57) ABSTRACT

An image invariant optical speckle capturing device and method. A highly coherent light is used to illuminate a surface and is scattered by the surface, and is captured from the direction with a ±10° from the angle of specular reflection. A light restrictive module is designed to confine the angular field of view of the sensor, when the speckle capturing device has a relative motion with respect to the surface, the speckle only move on the image but the shape and the intensity are almost keep constant, that is favorable for high accuracy optical pattern recognition and positioning.

18 Claims, 17 Drawing Sheets

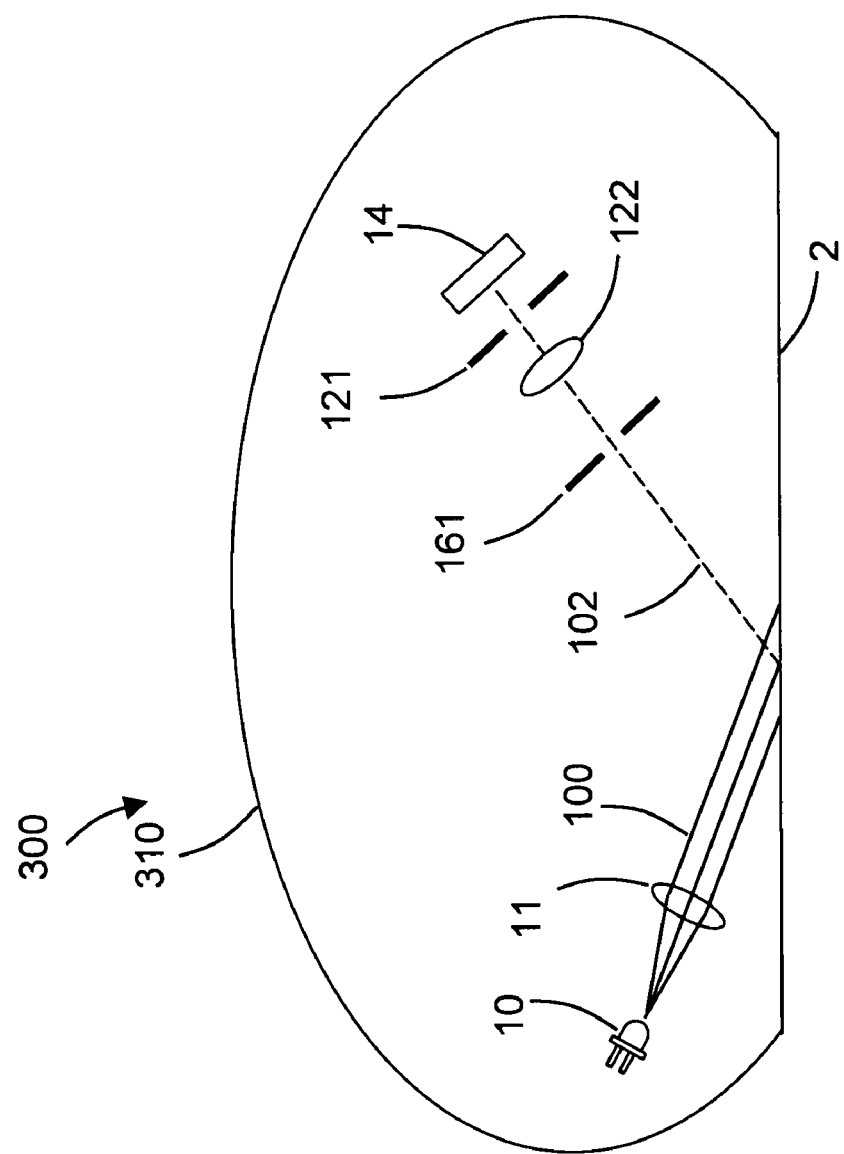

IMAGE INVARIANT OPTICAL SPECKLE CAPTURING DEVICE AND METHOD

CROSS-REFERENCE TO RELATED APPLICATIONS

This application is a continuation-in-part patent application of U.S. application Ser. No. 11/300,488 filed on Dec. 15, 2005, the entire contents of which are hereby incorporated by reference for which priority is claimed under 35 U.S.C. 517 120.

BACKGROUND OF THE INVENTION

1. Field of Invention

The invention relates to a device for capturing an image invariant optical speckle formed from interfering diffractive light, more particular, the optical speckle generated by passing scattered light through a small-aperture light restrictive element and the method thereof.

2. Related Art

When two highly coherent light beams overlap in the space and the optical path length difference less than the coherent length, an interference pattern is produced. Optical interference can be classified as constructive interference and destructive interference, where constructive interference produces spots with highly brightness whereas destructive interference results dark spots. Therefore, result of interference will be a spatial pattern with scattered bright and dark spots and is called speckle pattern or speckle image. Interference is related to the wavelength and the optical path length difference. When two light beams overlap in the space and the difference of optical path length between these two beams is odd integer multiple of half wavelength, destructive interference is produced. If the difference of optical path length between these two beams is integer multiple of the wavelength, constructive interference is created. Therefore, the sensitivity of the interference is half of the wavelength. The wavelength of light is fairly short, for example, wavelength range covered by visible light is from 0.4 µm to 0.7 µm. Half wavelength sensitivity is highly accurate and, therefore, interference effect is used extensively in a number of different fields.

When highly coherent light incidents on an optical rough surface, the scattered lights are produced and propagate in arbitrary directions in the space. When these scattered lights overlap in the space with the optical path difference less than the coherent length of the light, stable interference is produced. The result of the interference is an image with scattered bright and dark areas, called optical speckle.

Optical speckle was recognized as noise and considered as a ruining factor for an optical system. While optical speckle was discovered to have relation with the movement, it was used as a kind of sensing technique. Recently, unique of optical speckle was used as sensing technique for movement sensing. An U.S. Pat. No. 6,642,506 B1 (referred as patent 506 thereafter) published in 2003 discloses a one-dimensional displacement sensing in which the optical speckle pattern is captured by a device consists of a coherent light, an optical aperture, and an imaging lens. The favorite size of speckle can be obtained by using an aperture of suitable dimension in patent 506 in order to match the pixel size of the imaging sensor. Patent 506 further emphasized that the aperture has to be placed at the focal point of the imaging lens and, the optical axis of imaging lens and aperture is perpendicular to the surface, such that the height variation in the vertical direction on the surface has little effect on the speckle.

Another U.S. patent number 20050024623 (referred as patent 623 thereafter) discloses an optical displacement detection method and device. A highly coherent light source is used to emit a coherent light beam, illuminates a surface and reflected by the surface, the specular reflected light is received by a sensor disposed in the direction of reflection. When the angle of reflected light makes with the surface equals to the angle of incident light makes with the surface, called specular reflection. The sensor receives the specular reflected and the scattered lights simultaneously, the scattered lights interfere with each other and produce a number of speckles on the sensor. By comparing the speckle pattern after the movement and the speckle pattern prior the movement, the direction and the amount of displacement can be determined.

Another related technique is published U.S. patent application WO2004075040 (referred as case 040 thereafter) discloses an optical signal processing method and device, which is used in an optical mouse with digital signal processing. By collecting the speckle movement signals, the relative displacement of the mouse with respect to the surface, on which the scattered light is produced, can be obtained. The mouse comprises electrical signal amplification and shaping modules, direction decision and counting modules, computer interface, a laser light source, and a sensor for receiving the laser speckle image. The speckle image received by the sensor is transferred to electric signal and send to the signal amplification and shaping modules. All of signal analyses described above are related to analyze the counts of bright and dark spots in the speckle image, which is captured by the sensor and, then, transferred to the direction of movement and the amount of displacement. The structure in case 040 is simple. But if the surface is smooth, the speckle size created will be very small, unfavorable for the analysis of bright and dark areas of speckle. Therefore, the resolution capability and sensitivity of the system will be degraded.

The specular reflection is received by the sensor in patent 623 and the received signal is then divided into DC and AC parts. DC part is smooth brightness of the reflected light, AC part is the bright and dark areas of the speckle. When the size of speckle is too small, the AC signal is difficult to recognizing and, therefore, is difficult to analyzing.

The aperture has to be placed at the focal point of the imaging lens in patent 506, which is a telecentric projection system. Although the system is insensitive to the variation of height in the vertical direction, the aperture in this structure has no capability to confine the image capturing area on the surface, however. That means this structure can not confine the angular field of view of sensor to the scattered light from the surface. The structure in patent 506 can be used to control the size of speckle but has limit capability to avoid the variation of speckle during the relative motion between surface and the imaging system.

Therefore, the key factors for accurately and correctly recognize a two-dimensional speckle pattern include adequacy of speckle size, brightness of speckle that is created by constructive interference, signal to noise ratio of the speckle pattern and, most of all, is the speckle in a speckle pattern image invariant. The image invariant optical speckle pattern is the unique one which is favorable for correct navigation and precision positioning and can be extensively used in such devices as laser mouse, finger navigation, intelligence card, three-dimensional finger print identification.

SUMMARY OF THE INVENTION

To solve the problems described above, the purpose of this invention is to provide an image invariant optical speckle capturing device and method. The technique developed in this invention can be used to reasonably solve such problems as smaller size of speckle, shape variation, and intensity fluctuation of speckle.

Two-dimensional image invariant optical speckle capturing device can be used to capture the speckle pattern in a non-specular direction. For example, light is captured at an angle of ±10° from the specular reflection. A light restrictive aperture is introduced in the optical path to confine the angular field of view for the scattered light from the surface, i.e. to confine the image capturing area on the surface. By combining such factors as size of speckle, focal length of the image capturing lens, angle of image capturing, image capturing area on the surface, then the optical speckle captured by the speckle capturing device is image invariant. The image invariant optical speckle means when the speckle capturing device has a relative motion with respect to the surface, the captured optical speckles just move on the image plane without deformation, i.e., while the speckle capturing device continuously moves with respect to the surface, an optical speckle emerges from one side of the image sensor and moves successively until it disappear on the other side of the sensor, the shape and intensity of this optical speckle remains the same. Since the speckle captured by the speckle capturing device is image invariant, the image invariant optical speckle capturing device in this invention is very useful for the precision optical pattern recognition and positioning.

The characteristics and embodiments with accompanied drawings in this invention will be described in detail as follows.

BRIEF DESCRIPTION OF THE DRAWINGS

The present invention will become more fully understood from the detailed description given herein below illustration only, and thus are not limitative of the present invention, and wherein:

FIGS. 6A and 6B are schematic views of a laser mouse based on this invention.

DETAILED DESCRIPTION OF THE INVENTION

The following paragraphs describe how to obtain the image invariant optical speckle when there is a relative motion between the optical speckle capturing device in this invention and the surface. The calculation of optical path difference before and after the relative motion will be described in detail.

Figure 1A:
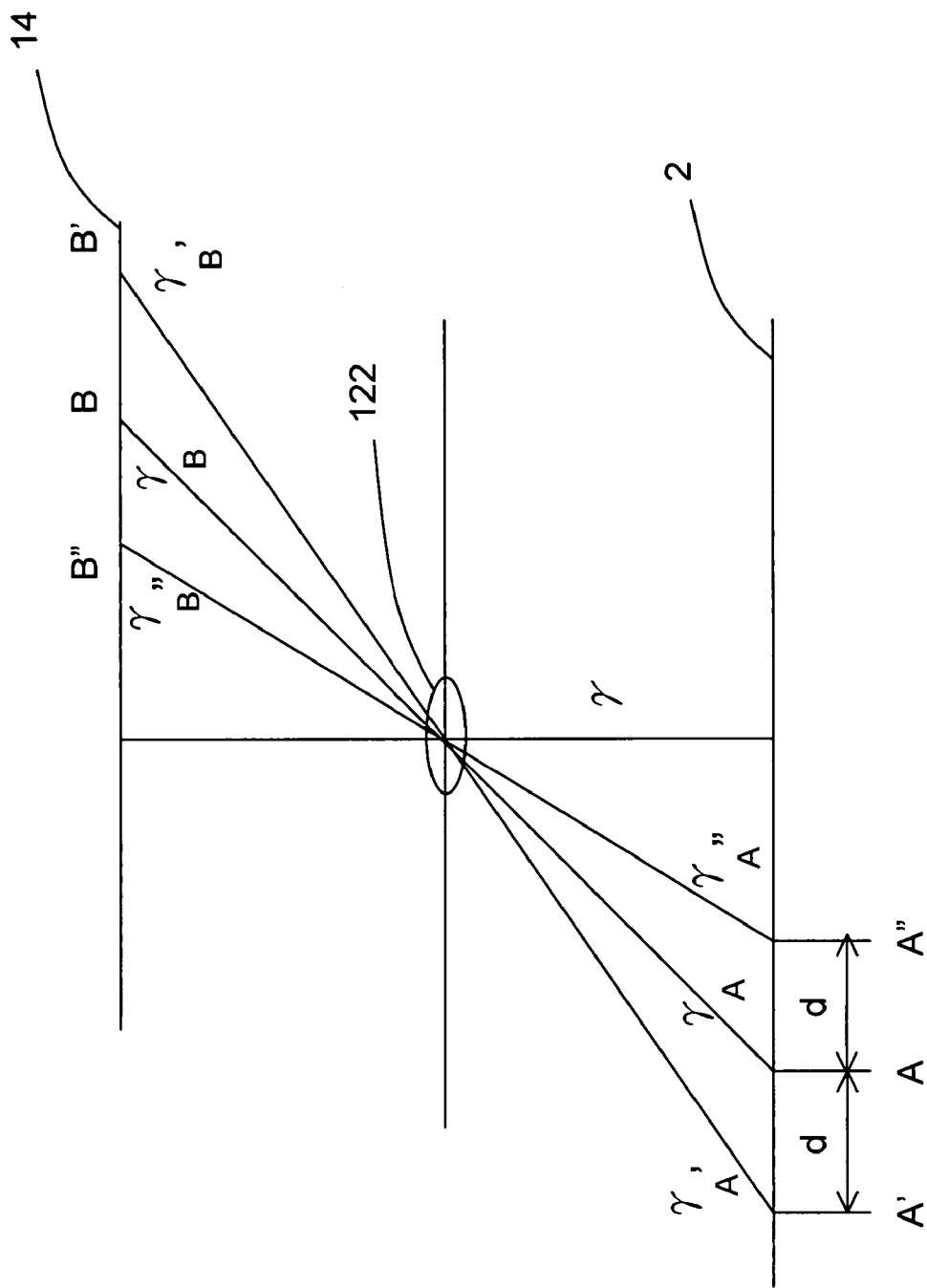
FIGS. 1A, 1B, and 1C are schematic view of the relative optical path difference between speckle images, which is used in theoretical calculation of this invention.

Laser speckle in this invention is formed via interference of lights that are scattered by the illuminated surface and diffracted by the elements in the speckle capturing device. Basically the speckle pattern created on an image sensor is related to such factors as nature of light source, characteristic of illuminated surface, arrangement of speckle capturing device, and pixel size of two-dimensional image sensor. It is difficult to analyze all of factors in detail and a reasonable model is developed in this invention to analyze the formation of speckle pattern. Laser is a highly coherent source and satisfies the critical conditions for creating speckle via interference. The characteristic of surface is the most difficult to handling and it is impossible to analyze the characteristic of all kinds of surfaces. One key point has to be emphasized in this invention is speckles with suitable size and high brightness are useful for image analyzing, speckles with small size and low brightness always mingle with noise and will be discarded. The analysis in this invention is thus focus to speckles with high brightness and large size. Brightness of speckle is dependent on the condition of interference, high brightness speckles are created by constructive interference. The average size of speckles is related to the characteristics of the speckle capturing device, however. The average size of speckles can be written as: $2\delta=2L\lambda/D$, where $2\delta$ is average diameter of speckles, $\lambda$ is wavelength of laser light, D is diameter of aperture of speckle capturing device, L is distance from the aperture to the image sensor. If lights from a scattering point and its adjacent scattering points are combined to produce a constructive interference on the image sensor, a bright and large size speckle is created. On the contrary, vague or no speckle is created when lights from a scattering point and its adjacent scattering points result a destructive interference on the image sensor. Cross correlation is used to match the speckle patterns created prior and after the relative motion between surface and speckle capturing device. Assume a first optical speckle pattern is recorded and there is a special speckle with high brightness, what happens on this speckle after the speckle capturing device moved a distance d with respect to surface ? Analyses as follows:

(i) A 4-f lens imaging system is chosen for convenient analysis in order to minimizing the dimension of the system, where f is focal length of the lens used in the imaging system. The object distance is equal to the image distance in a 4-f system, the magnification of the system M is equal to 1. Referring to FIG. 1A, where $\gamma_A=\gamma_B$, $\gamma_A'=\gamma_B'$, $\gamma_A''=\gamma_B''$ (ii) The size of speckle at location B on imaging plane can be assumed as average size $2\delta$ resulted from diffraction. Since the magnification of the system is 1, all of points within the area of radius $\delta$ and centered at point A on the surface will produce diffraction limit Airy disk, which size is $2\delta \approx 2L\lambda/D$, on the correspondent positions surround point B on the image plane. That Airy disk overlaps with other Airy disks created by other scattering points to produce interference. Point B is a bright point represents the scattered lights from each point within area of radius $\delta$ and centered at point A reach at point B with path length differences 0 or integer multiple of wavelength. Assuming the speckle capturing device moves a distance d with respect to surface, point A on the object plane moved to points A' or A'' with respect to the speckle capturing device, the correspondent image points will be B' or B'', respectively.

Figure 1B:
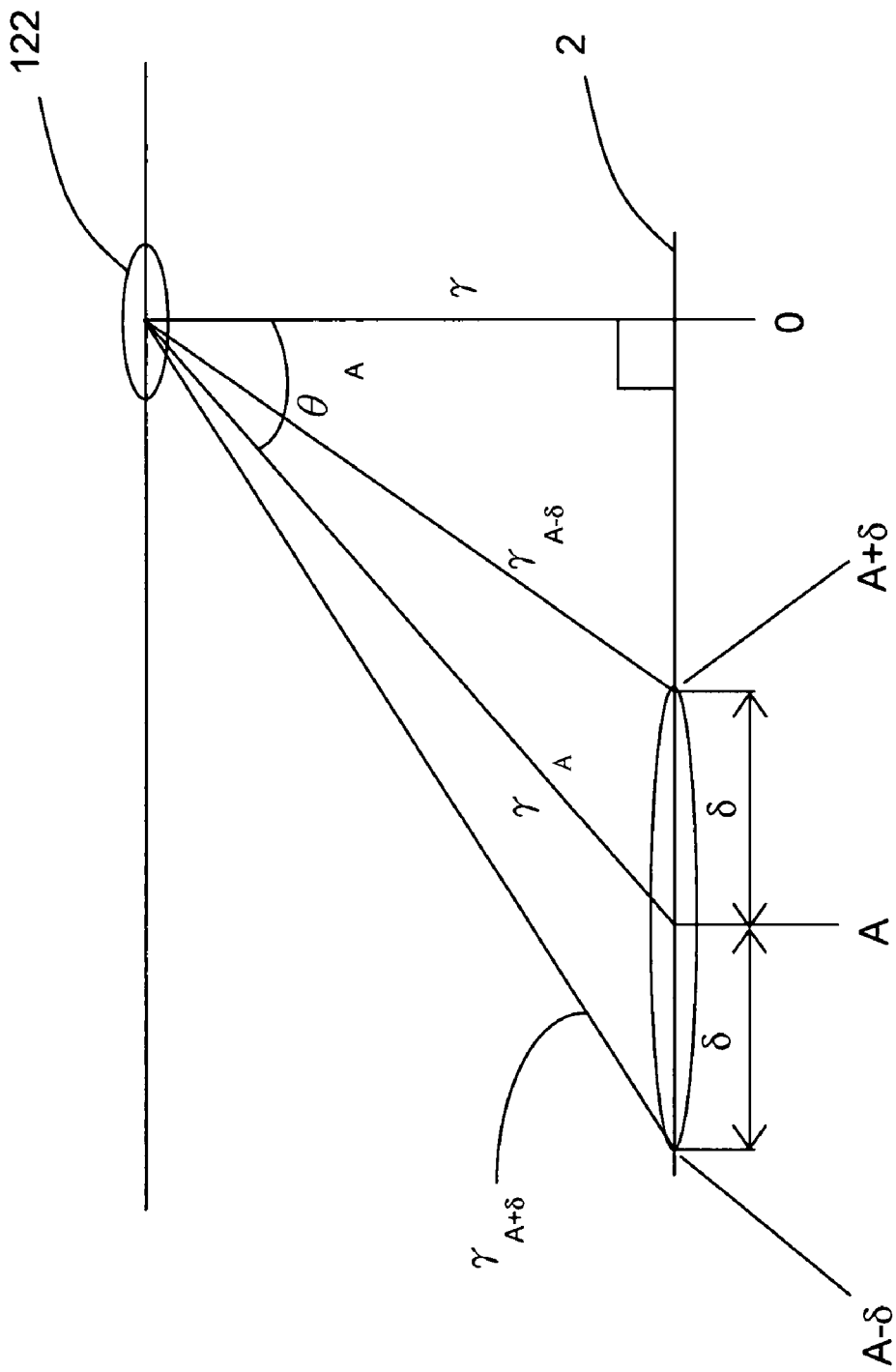

Assuming reasonably that $\gamma_A \cong 2f$ and $\gamma_A>>d>>\delta$. As shown in FIG. 1B, we evaluate the maximum optical path length difference that is created from the points within area of radius $\delta$ and centered at point A, $\gamma_{A+\delta}$ and $\gamma_{A-\delta}$ (expressed with $\gamma$, $\theta_A$, $\delta$, where $\delta$ is the average radius of optical speckle, $\theta_A$ is the angle of image capturing between optical axis of the light restrictive module and the normal direction of the surface, d is the moving distance and tunable from 0 to the diameter of the image capturing area and it is equal to the maximum movement distance during which the image is invariant, $\gamma$ is vertical separation from imaging lens to the surface):

$$\gamma_{A+\delta} = \sqrt{\gamma^2 + (\gamma \tan \theta_A + \delta)^2} = \gamma\sqrt{1 + \left(\tan \theta_A + \frac{\delta}{\gamma}\right)^2}$$

$$\gamma_{A-\delta} = \sqrt{\gamma^2 + (\gamma \tan \theta_A - \delta)^2} = \gamma\sqrt{1 + \left(\tan \theta_A - \frac{\delta}{\gamma}\right)^2}$$

Using Taylor's series expansion and omitting the second and higher order terms, $$f\left(\frac{\delta}{\gamma}\right) \cong f(0) + \frac{f'(0)}{1!}\left(\frac{\delta}{\gamma}\right)$$

$$\sqrt{1 + \left(\tan \theta_A + \frac{\delta}{\gamma}\right)^2} \cong \sqrt{1 + \tan^2 \theta_A} + \frac{\tan \theta_A}{\sqrt{1 + \tan^2 \theta_A}} \cdot \frac{\delta}{\gamma} =$$

$$\frac{1}{\cos \theta_A} + \sin \theta_A \cdot \frac{\delta}{\gamma}$$

$$\therefore \gamma_{A+\delta} = \gamma\sqrt{1 + \left(\tan \theta_A + \frac{\delta}{\gamma}\right)^2} \cong \frac{\gamma}{\cos \theta_A} + \delta \cdot \sin \theta_A$$

$$\therefore \gamma_{A-\delta} = \gamma\sqrt{1 + \left(\tan \theta_A - \frac{\delta}{\gamma}\right)^2} \cong \frac{\gamma}{\cos \theta_A} - \delta \cdot \sin \theta_A$$

$$\therefore \gamma_{A+\delta} - \gamma_{A-\delta} \cong 2\delta \cdot \sin \theta_A$$

Figure 1C:
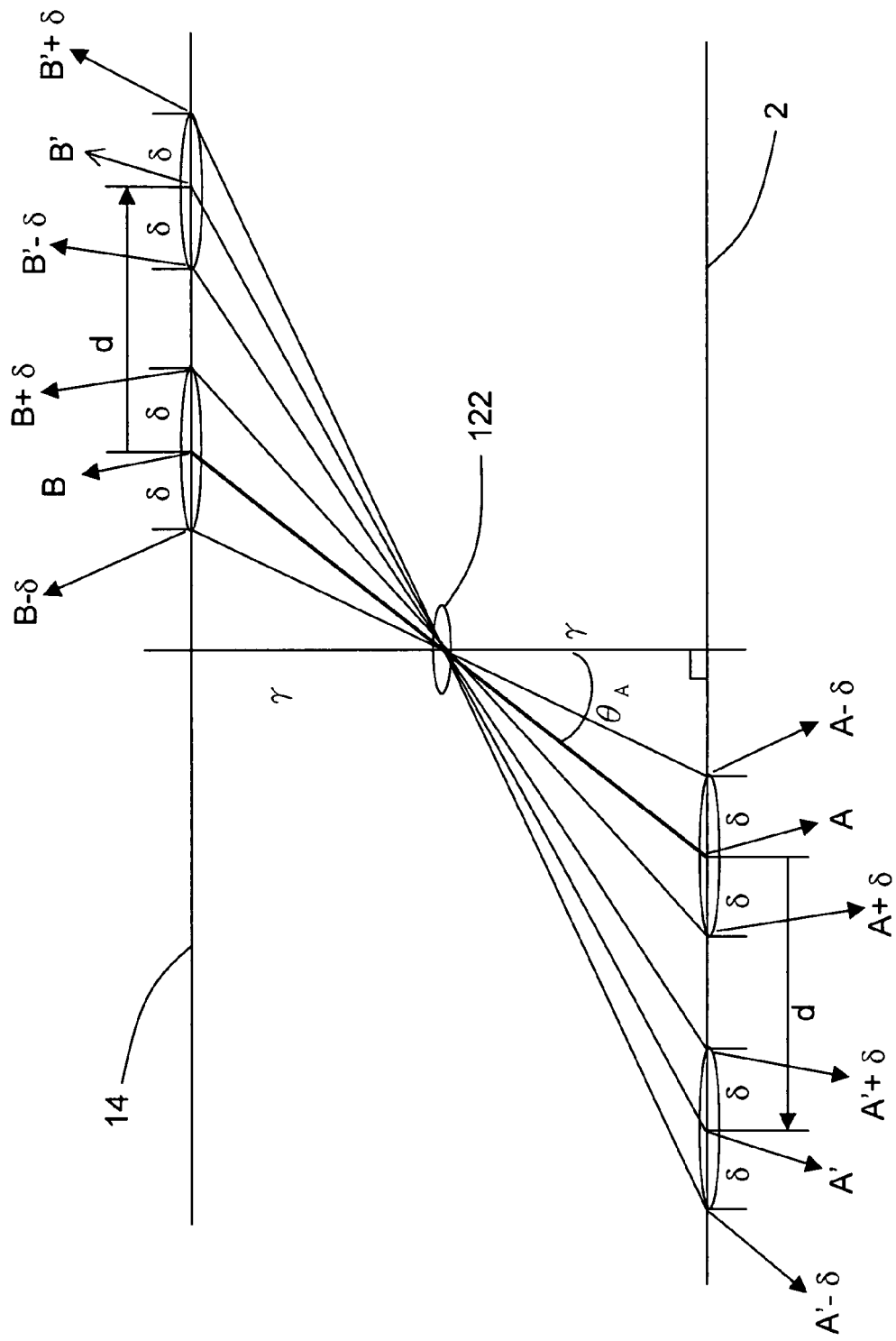

As shown in FIG. 1C, when the speckle capturing device has relative motion with respect to the surface, point A moves a distance d to reach point A' (the correspondent image point at B'), the maximum optical path length difference from all points within the area of radius $\delta$ and centered at point A' is calculated. Difference between $\gamma_{A'+\delta}$ and $\gamma_{A'-\delta}$ is:

$$\gamma_{A'+\delta} - \gamma_{A'-\delta} \cong 2\delta \sin \theta_{A'}$$

As shown in FIG. 1C, point A on the surface moves a distance d to reach point A', the maximum optical path length difference from all points within the area of radius $\delta$ and centered at point A', $\gamma_{A'+\delta} - \gamma_{A'-\delta}$, compared with the maximum optical path length difference from all points within the area of radius $\delta$ and centered at point A, $\gamma_{A+\delta} - \gamma_{A-\delta}$, the variation of these two maximum optical path length differences ($\gamma_{A'+\delta} - \gamma_{A'-\delta}) - (\gamma_{A+\delta} - \gamma_{A-\delta})$ can be calculated as follows.

Assuming $\theta_{A'} = \theta_A + \Delta\theta$, where $\Delta\theta$ is very small angle displacement, then:

$$\begin{aligned}(\gamma_{A'+\delta} - \gamma_{A'-\delta}) - (\gamma_{A+\delta} - \gamma_{A-\delta}) &= 2\delta \sin \theta_{A'} - 2\delta \sin \theta_A \\ &= 2\delta \sin(\theta_A + \Delta\theta) - 2\delta \sin \theta_A \\ &= 2\delta(\sin \theta_A \cos \Delta\theta + \cos \theta_A \sin \Delta\theta) - 2\delta \sin \theta_A \\ &\cong 2\delta(\sin \theta_A + \cos \theta_A \cdot \Delta\theta) - 2\delta \sin \theta_A \\ &= 2\delta \cos \theta_A \cdot \Delta\theta\end{aligned}$$

Since $\Delta\theta \cong \frac{d \cos \theta_A}{\gamma_A}$ and $\gamma_A = \frac{\gamma}{\cos \theta_A}$, then $$(\gamma_{A'+\delta} - \gamma_{A'-\delta}) - (\gamma_{A+\delta} - \gamma_{A-\delta}) \cong 2\delta\frac{d}{\gamma}\cos^3 \theta_A$$

Assume the scattered light from point A of the surface passes through 4-f lens is imaged at point B on the optical sensor, then similarly, scattered lights from points A' and A" of the surface are imaged at points B' and B" on the optical sensor, respectively. Diffraction effect shows that each point on the image plane within radius $\delta$ (radius of Airy Disk and average radius of the speckle) centered at point B has energy coupling with point B, i.e., each point provides contribution to the interference at point B. Further, under the condition of magnification equals to 1, point B is a bright point means scattered lights from each point within radius $\delta$ centered at point A on the surface create construction interference at point B. The equivalent optical path length difference from each point within radius $\delta$ centered at point A to point B can be considered as 0. In other words, originally the maximum optical path length difference from each point within radius $\delta$ centered at point A to point B, n($\gamma_{A+\delta}+\gamma_{B+\delta})-n(\gamma_{A-\delta}+\gamma_{B-\delta}) \approx 4\delta \sin \theta_A$ (n is assumed 1 because of air), is automatically compensated by the nature microstructure of the area surrounding point A. If there is a relative motion, d, between light source and the illuminated surface and the original surface condition is maintained, the maximum optical path length difference from each point within radius $\delta$ centered at point A' to point B' is $(\gamma_{A'+\delta}+\gamma_{B'+\delta})-(\gamma_{A'-\delta}+\gamma_{B'-\delta})$. This new maximum optical path length difference has to be compared with the original one in order to determine the variation of maximum optical path length differences, for the variation of maximum optical path length difference is the key factor to the intensity fluctuation of speckle. If the variation of maximum optical path length difference is half the wavelength then the original constructive interference becomes destructive interference after the relative movement. The variation of maximum optical path length difference because of the relative motion d is $[(\gamma_{A'+\delta}+\gamma_{B'+\delta})-(\gamma_{A'-\delta}+\gamma_{B'-\delta})]-[(\gamma_{A+\delta}+\gamma_{B+\delta})-(\gamma_{A-\delta}+\gamma_{B-\delta})] \approx 4\delta d \cos^3\theta_A/\gamma$. If $4\delta d \cos^3\theta_A/\gamma \ll \lambda$ is satisfied then the variation of maximum optical path length difference due to the relative motion d is very small. That means point B' is still a bright point because of constructive interference provided that point B is a bright point. The speckle is shifted in the image plane but there is no shape and intensity variation under this special condition, which is important for the image recognition. The variation of maximum optical path length difference in this invention had been calculated as $4\delta d \cos^3\theta_A/\gamma < \lambda/5$ and there had no shape variation and intensity fluctuation of speckle observed.

Figure 2A:
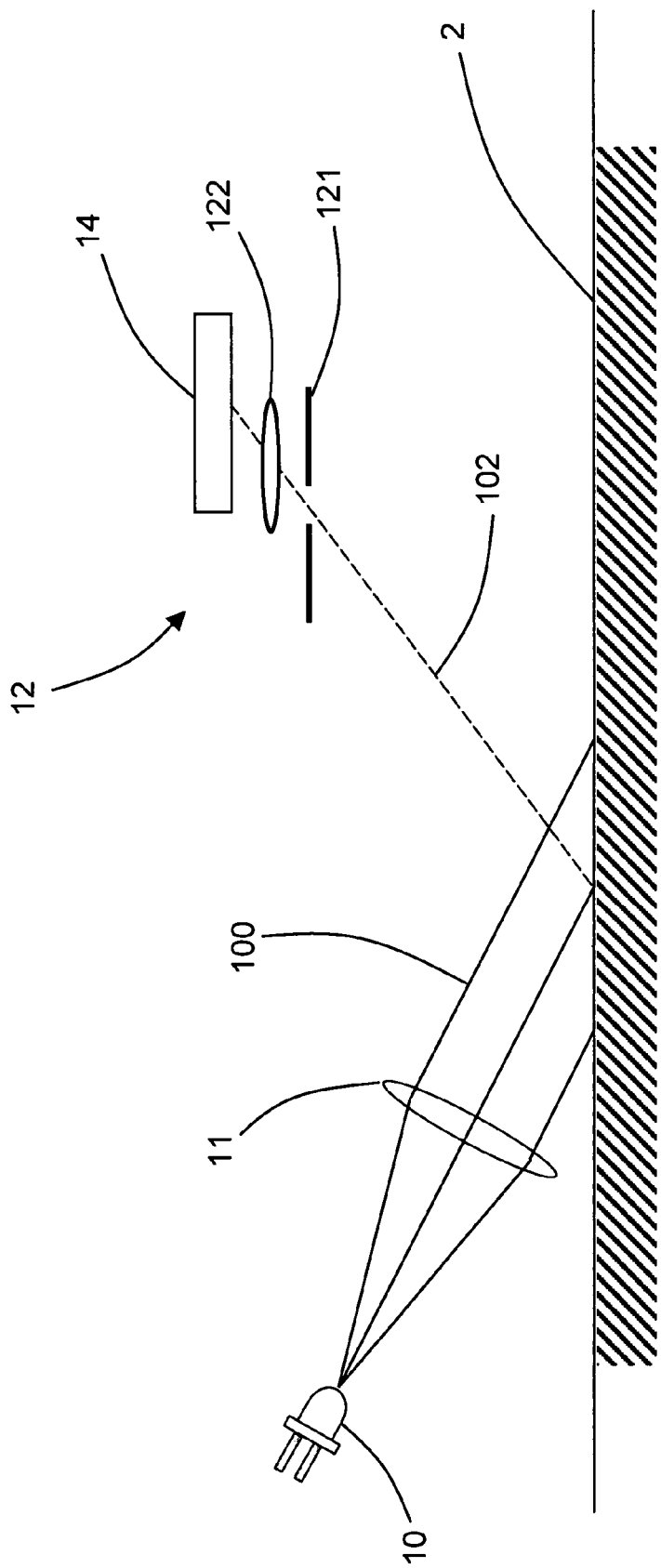
FIG. 2A illustrates the structure of a preferred embodiment according to this invention.

FIG. 2A is a drawing of the structure of one representative embodiment in which an image invariant optical speckle capturing device is disclosed. The device comprises a light source 10, a light restrictive module 12, and an optical sensor 14. A collimated light wave 100 is emitted by the light source 10 and a converge lens 11, illuminates a surface 2. The light source is coherent, for example, a laser. The light source 10 is therefore Vertical Cavity Surface Emitting Laser VCSEL, Edge Emission Laser EFL, high coherent solid state laser, or narrow band high coherent Light Emitting Diode LED. The area of the surface 2 illuminated by the collimated light wave 100 is adjusted according to the predetermined value by tuning the separation between light source 10 and converge lens 11. The light restrictive module 12 contains plural light restrictive elements. In this embodiment, light restrictive module 12 comprises an aperture 121 and an imaging lens 122 with the aperture 121 is disposed in between the imaging lens 122 and the surface 2. The optical sensor 14 is disposed behind the light restrictive module 12 and is a one-dimensional CDD or a two-dimensional CMOS array.

The light source 10 emits the collimated light wave 100 and illuminates the surface 2 and then results scattered lights 102. The characteristics of the scattered lights 102 are determined by the nature of the surface 2. A specular reflection is produced from the surface if the surface is highly smooth; all the scattered lights 102 propagate in the same direction and contain the same energy in the collimated light wave 100. The scattered lights 102 will be distributed in different directions provided that the surface 2 is an optical rough (diffused) surface.

Further, at least one of the scattered lights 102 will propagate to an arbitrary direction provided that the surface 2 is illuminated and is a rough surface and, then, an easily recognized speckle is created.

Further, the scattered lights 102 are produced when the light source 10 emits the collimated light wave 100 and illuminates the surface 2, at least one of the scattered lights 102 is collected by the light restrictive module 12, the light restrictive module 12 comprises an aperture 121 and an imaging lens 122 with the imaging lens 122 is disposed behind the aperture 121, means the imaging lens 122 is disposed in between the aperture 121 and the optical sensor 14. The light restrictive module 12 confine the incident angular field of view of the optical sensor 14 for the scattered light 102, the incident angular field of view is further determined by the separation between the aperture 121 and the imaging lens 122, the diameters of the aperture 121 and the imaging lens 122. Owing to the diameter of the aperture 121, at least one of the scattered lights 102 passes through the aperture and produces plural diffracted lights, the plural diffracted lights pass through the imaging lens 122 and create speckles. The average size of speckles can be manipulated by the diameter of the aperture 121 and plural speckles are then imaged on the optical sensor 14. By properly adjust such parameters as size of speckles, focal length of the imaging lens, angle of image capturing, and image capturing area of surface, a variation of maximum optical path length differences, $4\delta d \cos^3\theta_A/\gamma < \lambda/5$, can be satisfied and an image invariant optical speckle pattern is created on the image surface.

To obtain an image invariant optical speckle pattern from the finest feature of a three dimensional surface, the collimated light wave 100 incidents on that surface 2 with an incident angle $\theta_i$, the scattered lights 102 are collected at an angle of $\theta_i \pm 10°$ from the specular reflection in this invention. The light restrictive module 12 in this invention is designed to collect the scattered lights 102 at an angle of $\theta_i \pm 10°$ precisely. When a beam of nearly collimated light illuminates a surface, most of the scattered lights are concentrated to the direction at $\theta_r = \theta_i$, the scattered lights diminishes with the scattered direction deviates from $\theta_r = \theta_i$. The scattered light at direction $\theta_r = \theta_i$ contains two components, the major component comes from specular reflection of the surface and minor component comes from scattered light due to the natural microstructure of the surface. The light waves of specular reflection possess the same phase but the scattered lights possess random phase, interference produced while these light waves overlapped. By analyzing the relation of the interference pattern before and after the relative movement between the speckle capturing device and the surface, a quantitative data of the relative movement can be obtained. If the surface is optical rough enough, the specular reflection decreases and the random scatter increases, phase change rapidly, unfavorable for pattern recognition via cross correlation. Choosing the angle $\theta_r = \theta_i \pm 10°$ as the direction for collecting the scattered light waves in this invention, specular reflection can be avoided and more scattered light waves can be collected, optical speckle pattern created from three dimensional feature of the surface will be recorded effectively, precision recognition and positioning will be obtained.

Figure 2B:
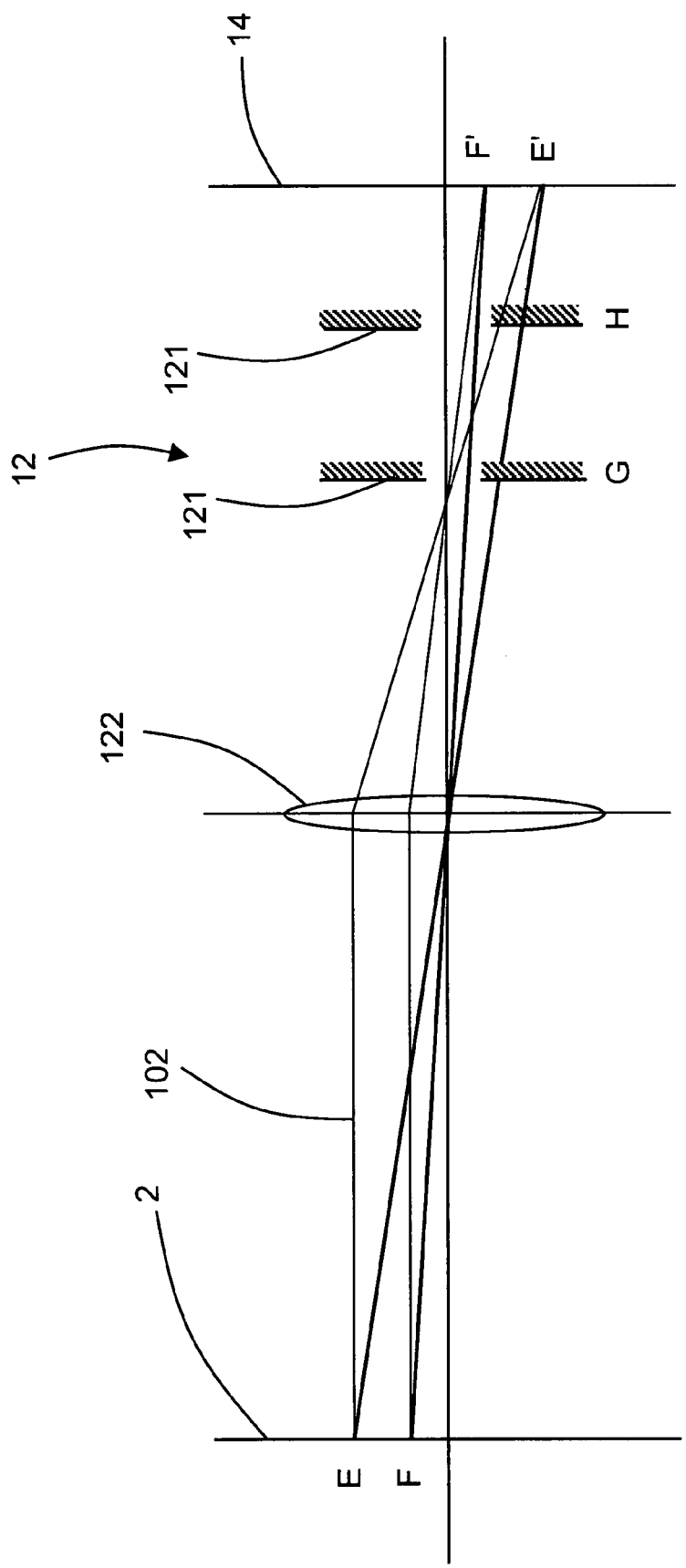
FIG. 2B is a schematic view of the optical path of a second exemplary embodiment according to this invention.

FIG. 2B is a drawing of optical path representing the relation between the location of aperture and the incident angular field of view of the sensor to the scattered light. Referring to the FIG., the light restrictive module 12 comprises the aperture 121 and the imaging lens 122, just the same as that in FIG. 1A, the aperture 121 can be disposed at point G or H. Compared the light restrictive module 12 with the aperture 121 at point G, the light restrictive module 12 with the aperture 121 at point H will block the scattered lights that is far from the optical axis. The optical path in the FIG. shows the aperture 121 is disposed behind the focal point of the imaging lens but in front of the sensor 14, the exact position of the aperture 121 is used to control the incident angular field of view, thus confine the image capturing area on the surface. This embodiment shows that when the light waves incident on points E and F on the surface 2, produces at least a scattered light 102, the scattered light 102 passes through the imaging lens 122, the scattered lights 102 from points E and F pass through the imaging lens 122 provided that the aperture 121 is disposed at point G, imaged on points E' and F' on the sensor 14, the light flux at F' is higher than the light flux at E'. For the aperture 121 disposed at H, the scattered light from near optical axis point F will pass through the imaging lens 122, imaged on F' on the sensor 14, the scattered light from far optical axis point E can not imaged on E' on the sensor 14. In this embodiment, the function of the aperture 121 is aperture stop, while the function of the imaging lens 122 is field stop. In this embodiment, the light restrictive component is proposed as an example, by properly adjust the diameter and position of the aperture in the light restrictive module 12 of this embodiment, the size of speckle can be manipulated and the angular field of view of the sensor 14 to the scattered light 102 can be confined, simultaneously. By properly combining such factors as size of speckle, focal length of imaging lens, angle of image capturing, and the parameters of the surface, the condition that the variation of maximum optical path length difference $4\delta d \cos^3\theta_A/\gamma < \lambda/5$ will be satisfied, an image invariant optical speckle image is thus produced on the image plane.

Figure 2C:
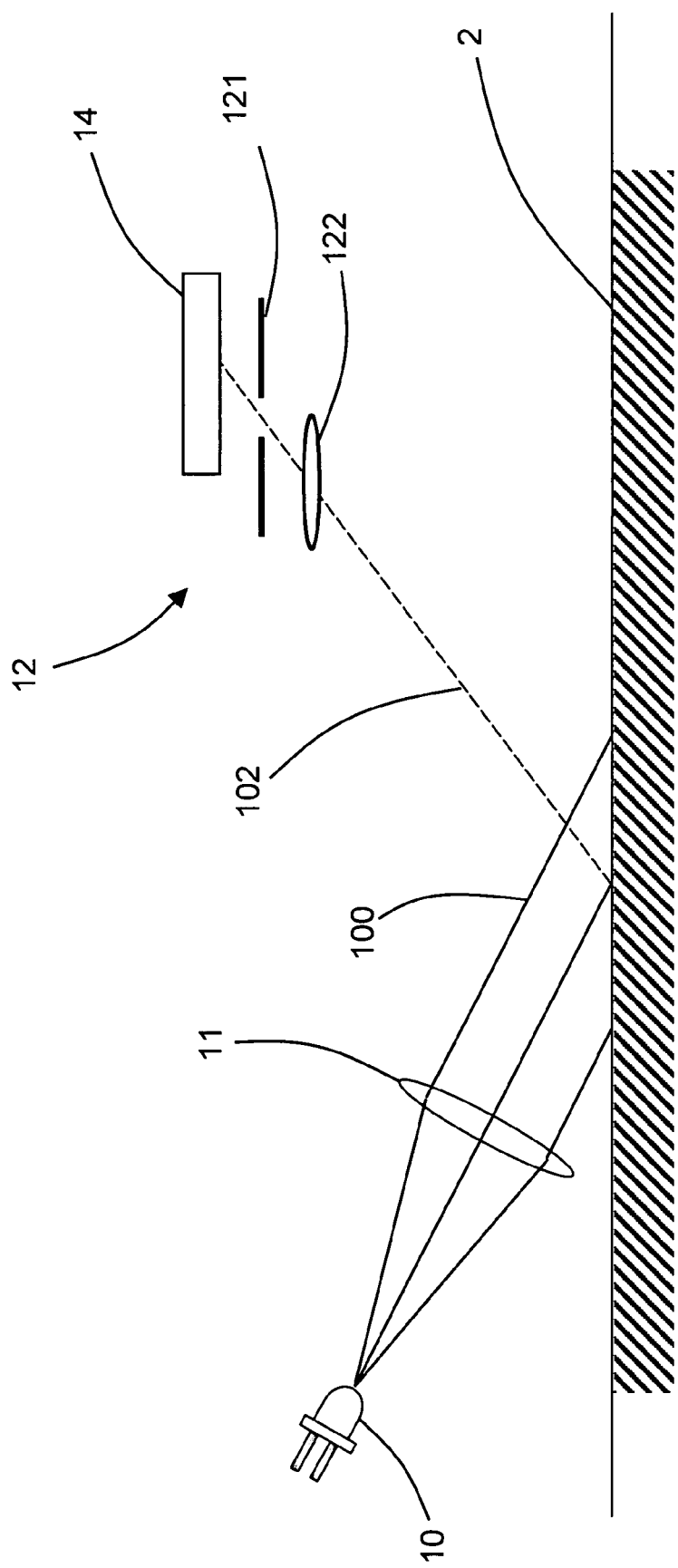
FIGS. 2C and 2D illustrate the structure of the other preferred embodiments according to this invention.

FIG. 2C is a drawing of the structure of another preferred embodiment according to this invention. Compare with FIG. 2A, the difference of this embodiment is the light restrictive module 12 also includes an imaging lens 122 and an aperture 121, while the imaging lens 122 is disposed in front of the aperture 121, means the aperture 121 is disposed between the imaging lens 122 and the sensor 14. For effectively achieving the purpose of confining the angular field of view of the sensor to receive scattered lights, the aperture 121 is disposed behind the focal point of the imaging lens 122 but in front of the sensor 14 in general.

Figure 2D:
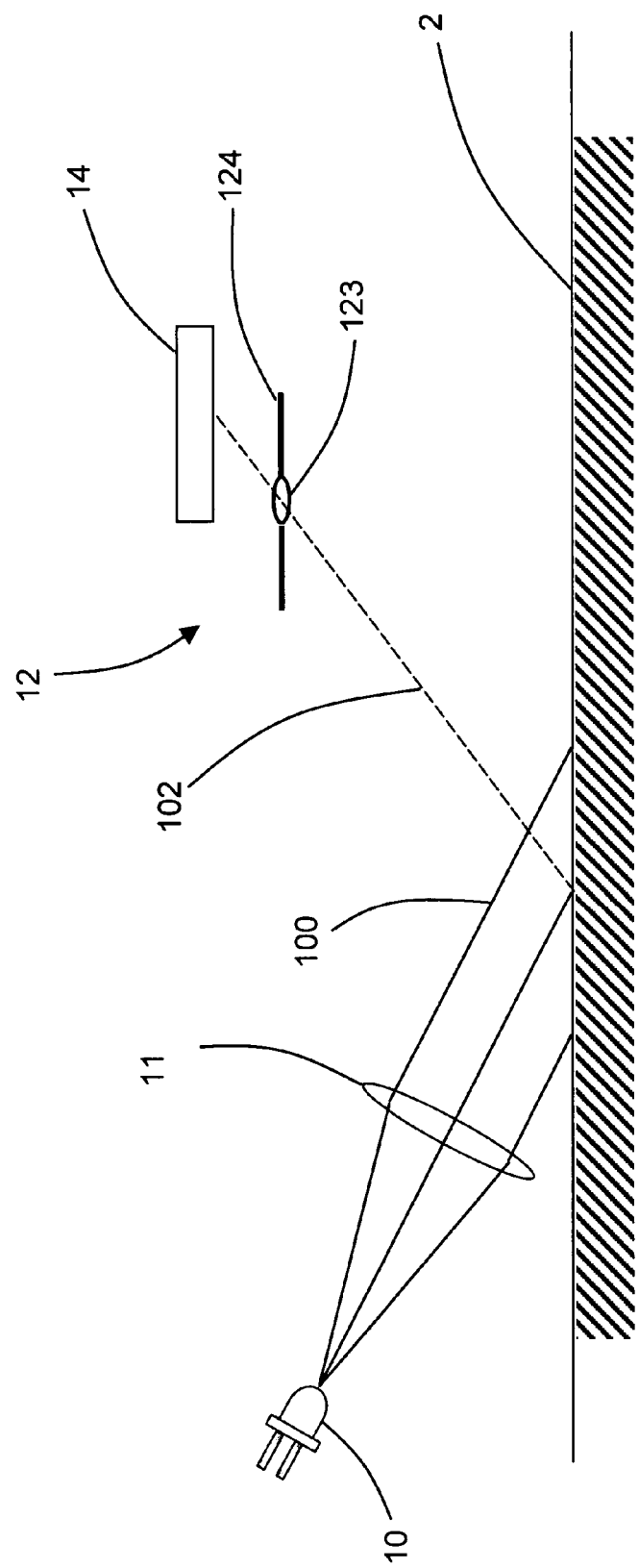

FIG. 2D is a drawing of the structure of another representative embodiment according to this invention. Compare with FIG. 2A, the difference of this embodiment is the light restrictive module 12 is a micro lens 123, surrounding the micro lens 123 is a light opaque plate 124, the function of the opaque plate 124 is the same as the aperture 121 in FIG. 2A, making at least a scattered light 102 diffracting, resulting the diffracting light wave. The micro lens 123 and the light opaque plate 124 combine with the illuminated area on the surface 2 can be used to confine the angular field of view of the sensor 14 to the scattered light 102, produce the image invariant optical speckle image on the sensor 14.

Figure 3:
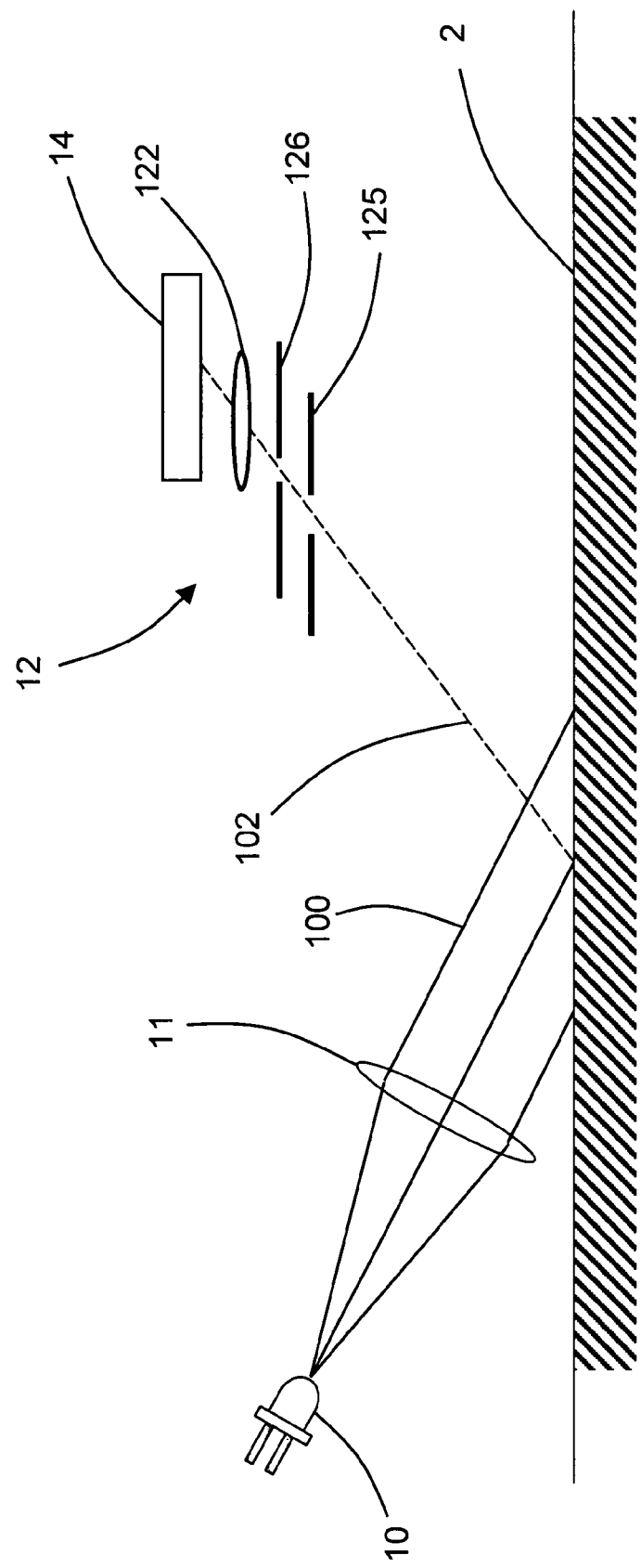
FIG. 3 illustrates the structure of another preferred embodiment according to this invention.

FIG. 3 is a drawing of the structure of another preferred embodiment according to this invention. Compare with FIG. 2A, the difference of this embodiment is the light restrictive module 12 contains an imaging lens 122, a first aperture 125, and a second aperture 126. The imaging lens 122 is disposed behind the first aperture 125 and the second aperture 126, means the imaging lens 122 is disposed in between the second aperture 126 and the sensor 14. In this arrangement the first aperture 125 is disposed first, then placed the second aperture 126, and then disposed the imaging lens 122, the sensor 14 is disposed at last. When the light source 10 emits a light wave 100 to illuminate the surface 2 and produces at least a scattered light 102, the first aperture 125 blocks part of the scattered light 102, confine the scattered light 102 from entering the sensor 14. When part of the scattered light 102 pass through the first aperture 125, the second aperture 126 further blocks part of the scattered light 102 from entering the sensor 14. The diameter and the separation between the first aperture 125 and the second aperture 126 determine the angular field of view of the sensor 14 to the scattered light 102, i.e., limiting the image capturing area on the surface. The scattered light 102 within the angular field of view is further diffracted and passed through the imaging lens 122, imaged on the sensor 14, and then produce an image invariant optical speckle pattern. In another arrangement, a light restrictive module 12 is also comprises of the imaging lens 122, the first aperture 125, and the second aperture 126, with the imaging lens 122 could also be disposed in front of the first aperture 125 and the second aperture 126, means the first aperture 125 and the second aperture 126 are disposed in between the imaging lens 122 and the sensor 14. In another arrangement, the imaging lens 122 could also be disposed in between the first aperture 125 and the second aperture 126.

Figure 4A:
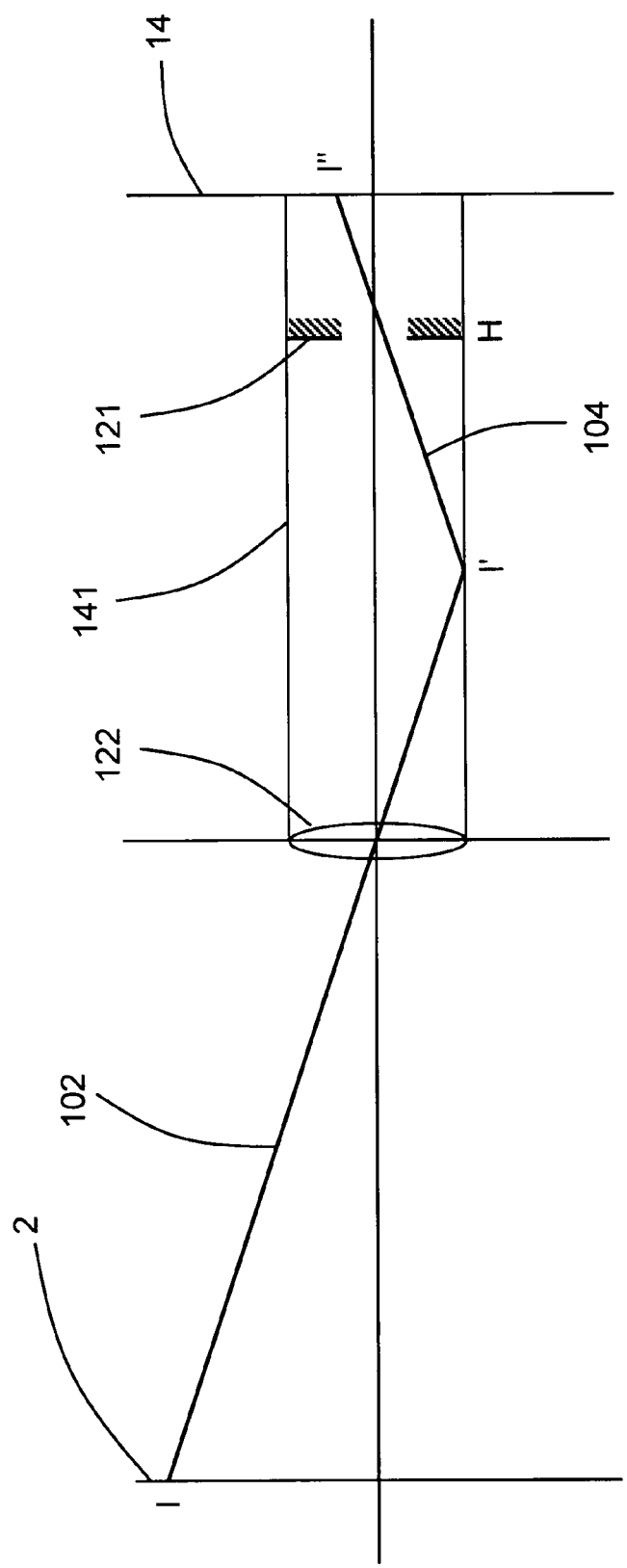
FIG. 4A is a schematic view of the secondary scattering.

FIG. 4A is a drawing shows the producing of the second scattered light due to the general package of image sensor. Referring to FIG. 2B, the light restrictive module 12 contains an imaging lens 122 and an aperture 121, with a sleeve 141 is built surrounding the sensor 14. From the FIG., location I on the surface 2 is out of the angular field of view of the sensor 14. At least a scattered light 102 produced at point I, the scattered light incidents at I' on the inner surface of the sleeve 141, results a secondary scattered light 104, the secondary scattered light 104 pass through the aperture 121 located at H and fall on the location I'' of the sensor 14. It is difficult to produce an image invariant optical speckle pattern provided that the secondary scattered light 104 has not eliminated. The phase change of secondary scattered light is random and difficult to handle, when the secondary scattered light 104 overlap with the scattered light 102 on the image plane, the resulted speckle flickers frequently, image invariant optical speckle can not obtained under this situation.

Figure 4B:
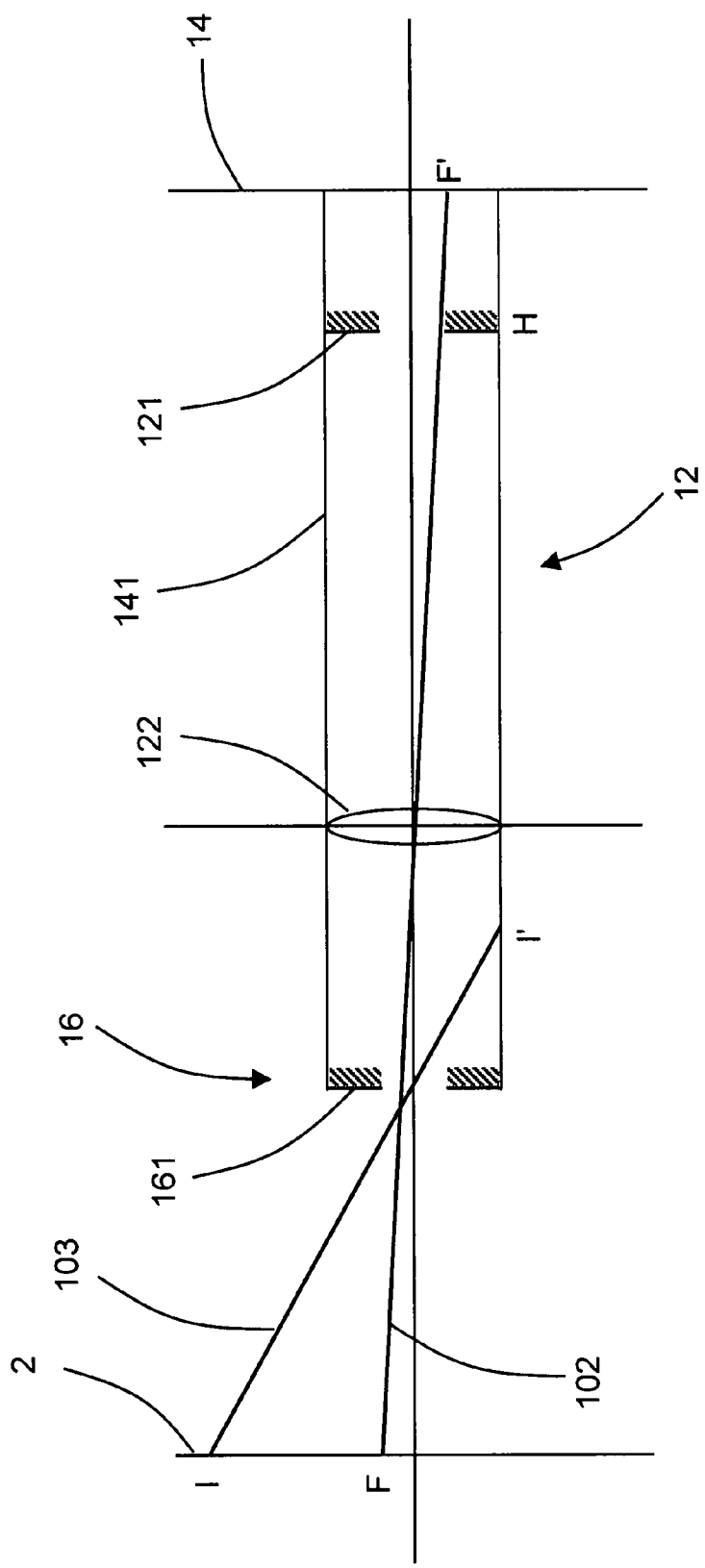
FIG. 4B is a schematic view of the optical path of another exemplary embodiment according to this invention.

FIG. 4B is a drawing shows another preferred embodiment according this invention. Compare with FIG. 4A, in order to prevent the secondary scattered light 104, which is produced by the scattered light 102 incident on the inner surface of the sleeve 141 and further scattered, from entering the sensor 14, a pre-stage light restrictive element 16 is disposed in front of the light restrictive module 12. The pre-stage light restrictive element 16 in this embodiment is a light restrictive aperture 161, the pre-stage light restrictive aperture 161 is disposed between the surface 2 and the light restrictive module 12, the light restrictive module 12 comprises an imaging lens 122 and an aperture 121, the pre-stage light restrictive aperture 161 is thus positioned between the surface 2 and the imaging lens 122, the aperture 121 is disposed in between the imaging lens 122 and the sensor 14. When the collimated light wave incidents on the locations F and I on the surface 2, the scattered light 102 from location F passes through the pre-stage light restrictive aperture 161, the imaging lens 122, and the aperture 121 and, then, imaged directly on the sensor 14. The scattered light 102 from location I, which is outside the imaging area, will be blocked by the pre-stage light restrictive aperture 161. Part of the non-blocked light 103 incident on the inner surface of the sleeve 141 and create the secondary scattered light, will not reach the sensor 14. The background noise is reduced effectively and the signal to noise ratio of the sensor 14 is enhanced, an image invariant optical speckle is thus obtained.

Figure 4C:
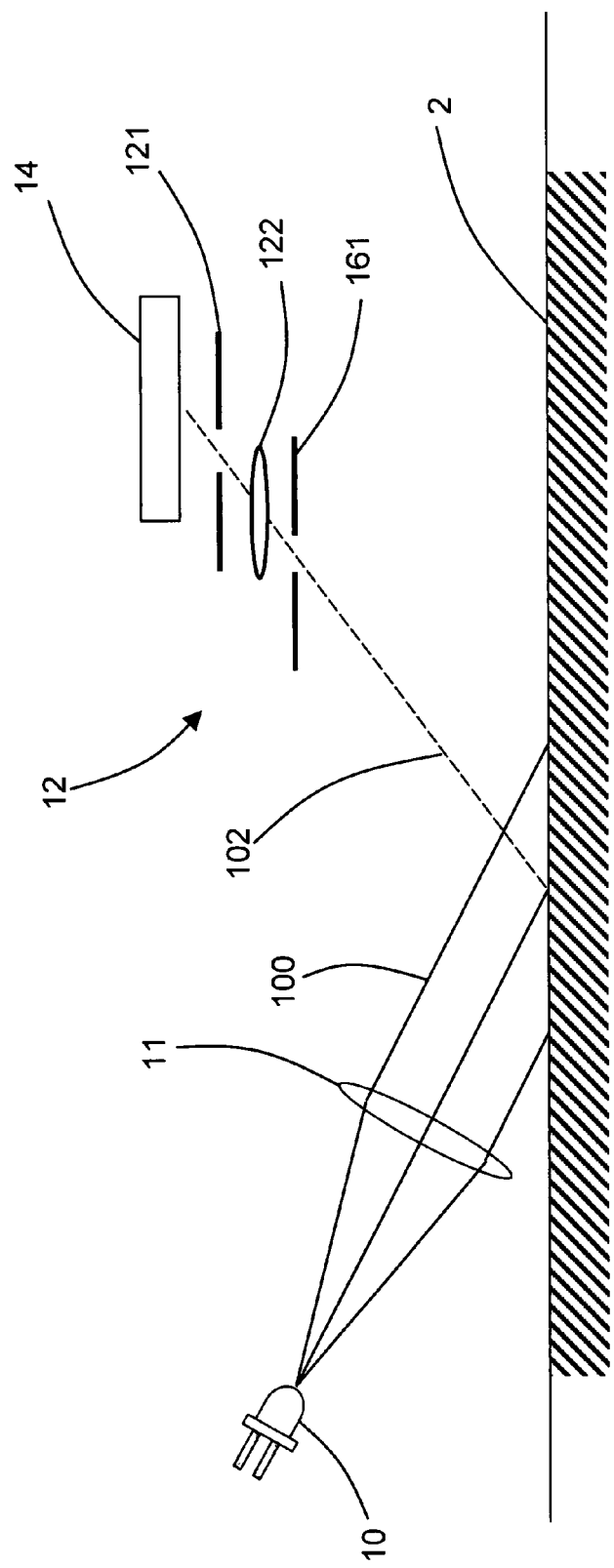
FIG. 4C illustrates the structure of another preferred embodiment according to this invention.

FIG. 4C is a drawing of the structure of another preferred embodiment according to this invention. Compare with FIG. 2C, the difference of this embodiment is each light restrictive module 12 comprises an imaging lens 122 and an aperture 121, a pre-stage aperture 161 is introduced in between the imaging lens 122 and the surface 2. The pre-stage aperture 161 is used to block the secondary scattered light, which is produced by the scattered light 102 from the surface 2, and to prevent the secondary scattered light from entering the sensor 14. The background noise of the sensor 14 is then reduced and an image invariant optical speckle is thus obtained.

Figure 5:
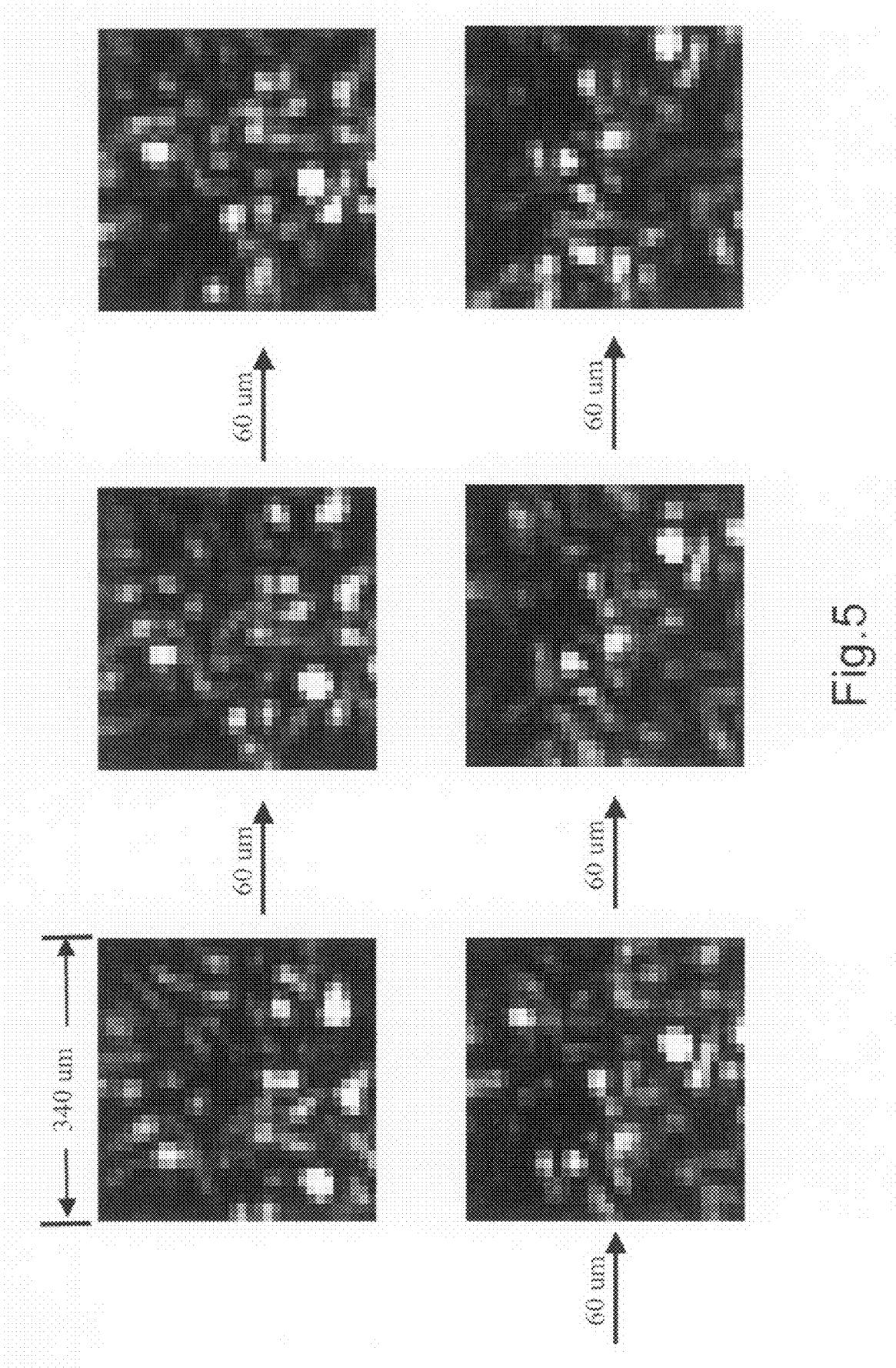
FIG. 5 shows the pictures of the image invariant optical speckles that are captured by an image invariant optical speckle capturing device according to this invention.

All of the structures described from FIG. 2A to FIG. 4C are the representative embodiments in this invention, the image invariant optical speckle capturing devices comprise a light emitting source, a light restrictive module 12, and a sensor. The light restrictive module 12 confines the angular field of view of the sensor 14 to the scattered light 102, i.e., confines the image capturing area on the surface. By properly combining such parameters as size of speckle, focal length of imaging lens, angle of image capturing, and imaging area on the surface, the condition that the variation of maximum optical path length difference $4\delta d \cos^3\theta_A/\gamma < \lambda/5$ will be satisfied, an image invariant optical speckle image can be obtained on the image plane. The image invariant optical speckle image can further be applied in such devices as laser mouse, finger navigator, intelligent card, three-dimension status identification, high accuracy positioning device for machine tool or mechanical arm. The speckle image caught by a laser speckle optical capturing device which is built based on the structure of FIG. 4C in this invention is shown in FIG. 5, the surface was a rigid mouse testing plate, the shifted distance between each frame was 60 μm, successively shifting frames are shown in the FIG. from left to right. To observe the frames sequentially, a speckle image emerges from one side of the image sensor and moves successively until it moves out of the image sensor, the speckle only being shifted but without any shape variation and intensity fluctuation, an image invariant optical speckle image thus being demonstrated.

Therefore, the image invariant optical speckle capturing device in this invention can be applied to laser mouse. FIG.

6A is a drawing of laser mouse according to this invention where both of light source 10 and sensor 14 are disposed inside the case 310 of the laser mouse 300. The light source 10 emits a light wave to pass through a converge lens 11 and produce a collimated light wave and incident on surface 2, produce scattered light wave 102, at least a said scattered light 102 pass through a properly adjusted light restrictive module 12 which is comprised of imaging lens 122 and aperture 121. The scattered light 102 pass through the imaging lens 122 and the aperture 121 and diffracted, create speckle with adequate size on the image sensor 14, the aperture also limit the angular field of view of the sensor 14 to the scattered light 102. Before the case 310 moves, the sensor 14 records a first speckle image, after the case 310 moves relative to the surface 2, the sensor 14 records a second speckle image. Compare the first speckle image with the second speckle image, the movement direction and distance of the case 310 relative to the surface 2 can be calculated, which is a basic signal of a laser mouse.

Figure 6A:
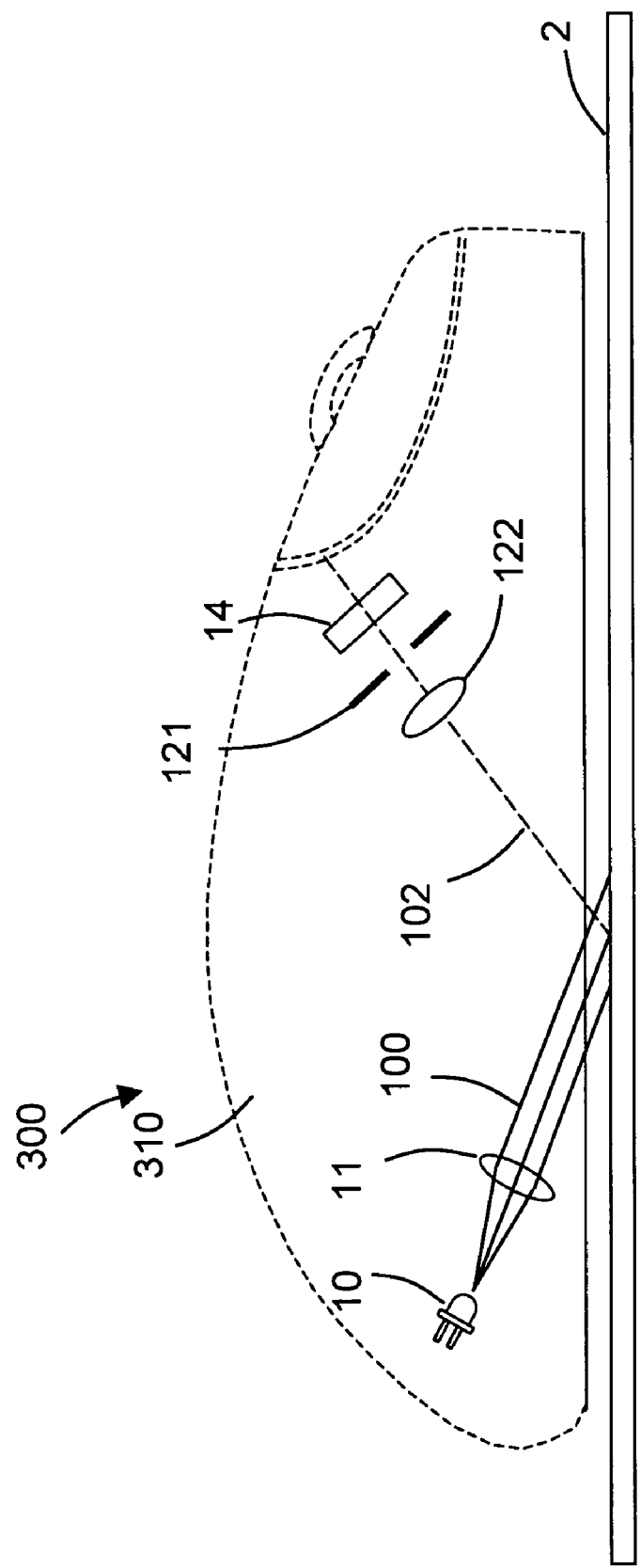

Referring to FIG. 6B, light source 10 and sensor 14 are disposed inside the case 310 of the laser mouse 300. The light source 10 emits a light wave to pass through a converge lens 11 and produce a collimated light wave and incident on surface 2, produce scattered light wave 102, the scattered light 102 pass through a pre-stage light restrictive aperture 161 and afterward produce a second scattered light, the second scattered light is blocked and can not reach the sensor 14. At least a said scattered light 102 pass through the pre-stage light restrictive aperture 161, further pass through a properly adjusted light restrictive module 12 which is comprised of imaging lens 122 and aperture 121. The scattered light 102 pass through the imaging lens 122 and the aperture 121 and diffracted, create speckle with adequate size on the image sensor 14, the aperture also limit the surface image capturing area which is received by the sensor 14. Before the case 310 moves, the sensor 14 records a first speckle image, after the case 310 moves relative to the surface 2, the sensor 14 records a second speckle image. Compare the first speckle image with the second speckle image, the movement direction and distance of the case 310 relative to the surface 2 can be calculated, which is a basic signal of a laser mouse.

Figure 7A:
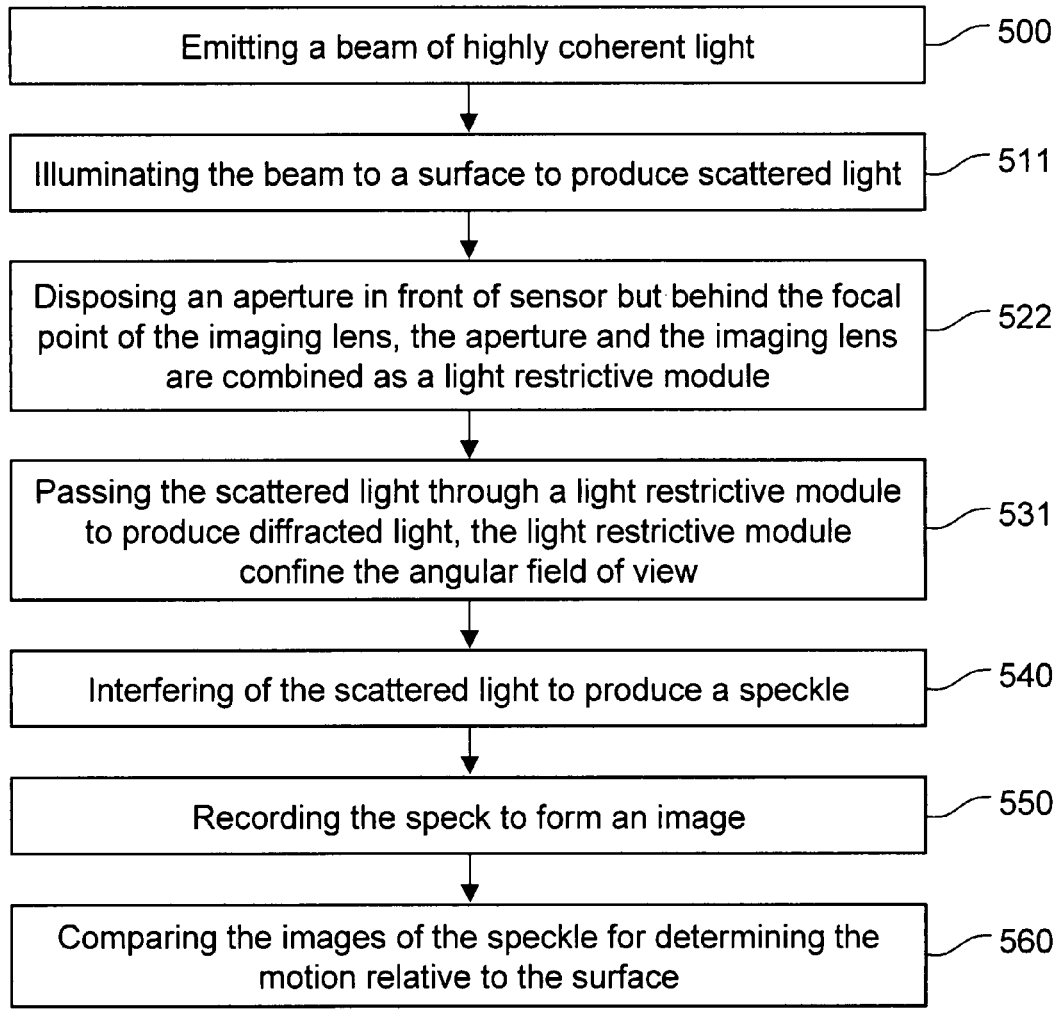
FIGS. 7A, 7B, and 7C illustrate the procedures for producing image invariant optical speckle capturing according to this invention.

From the description above, an image invariant speckle capturing device and method is presented. Referring to FIG. 7A, a beam of highly coherent light is emitted first (step 500). The beam of highly coherent light incidents on a surface, produce a scattered light (step 511). An aperture is disposed behind the focal point of the imaging lens but in front of the sensor, the aperture and the imaging lens comprised as a light restrictive module (step 522). When the scattered light pass through the light restrictive module, the angular field of view of the sensor for the scattered light is limited by the light restrictive module, the scattered light is further diffracted by the light restrictive module (step 531). The diffracted lights interfere with each other and produce the speckle (step 540). The speckle is recorded as an image (step 550). The movement of the speckle image is recognized via pattern recognition of the images, a relative motion between the speckle capturing device and the surface can be determined (step 560).

Figure 7B:
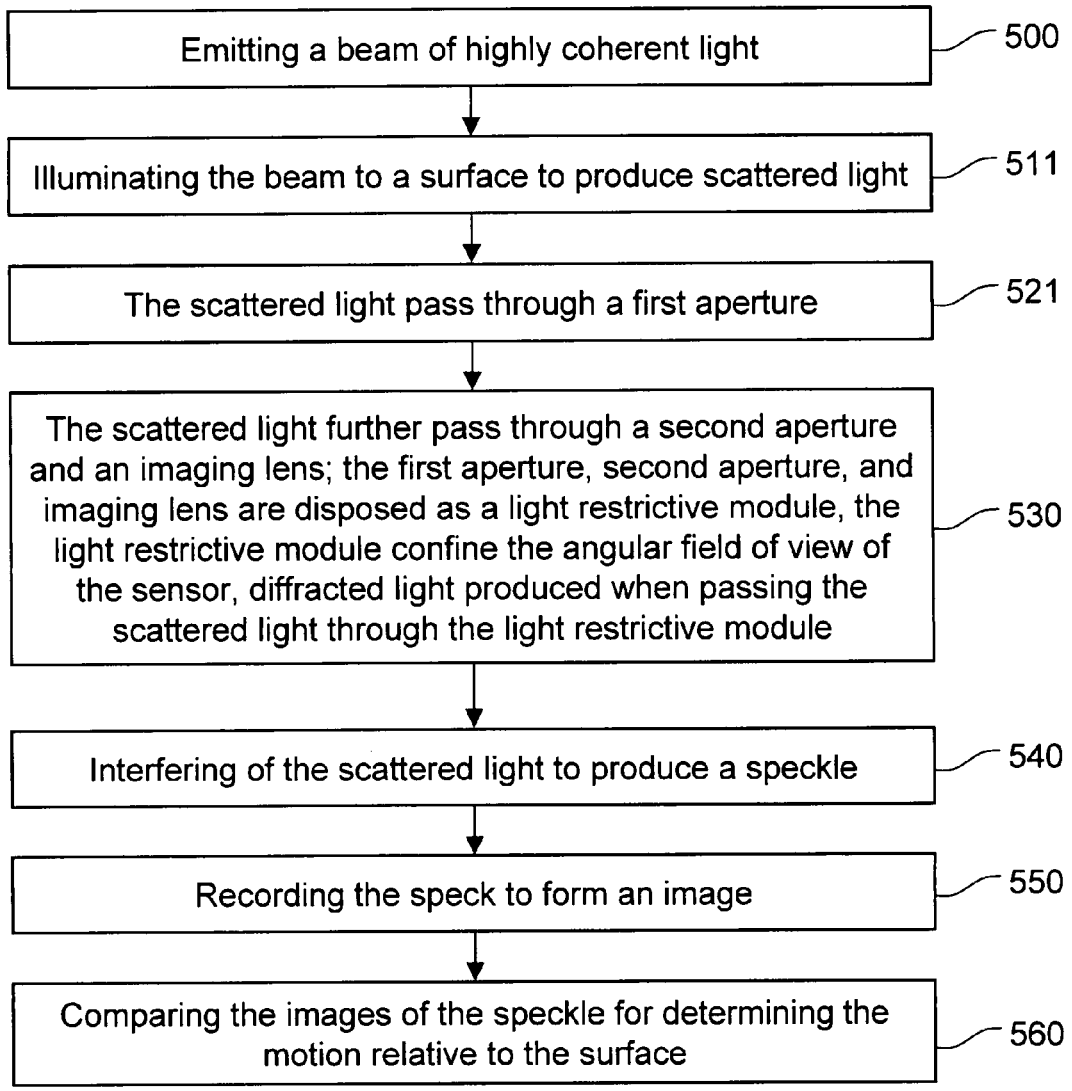

Referring to FIG. 7B, a beam of highly coherent light is emitted first (step 500). The beam of highly coherent light incidents on a surface, produce a scattered light (step 511). The scattered light passes through a first aperture (step 521). The scattered light further pass through a second aperture and an imaging lens, where the first aperture and the second aperture comprise a light restrictive module, the angular field of view of the sensor for the scattered light is limited by the light restrictive module; the scattered light is further diffracted by the light restrictive module (step 530). The diffracted lights interfere with each other and produce the speckle (step 540). The speckle is recorded as an image (step 550). The movement of the speckle image is recognized via pattern recognition of the images, a relative motion between the speckle capturing device and the surface can be determined (step 560).

Figure 7C:
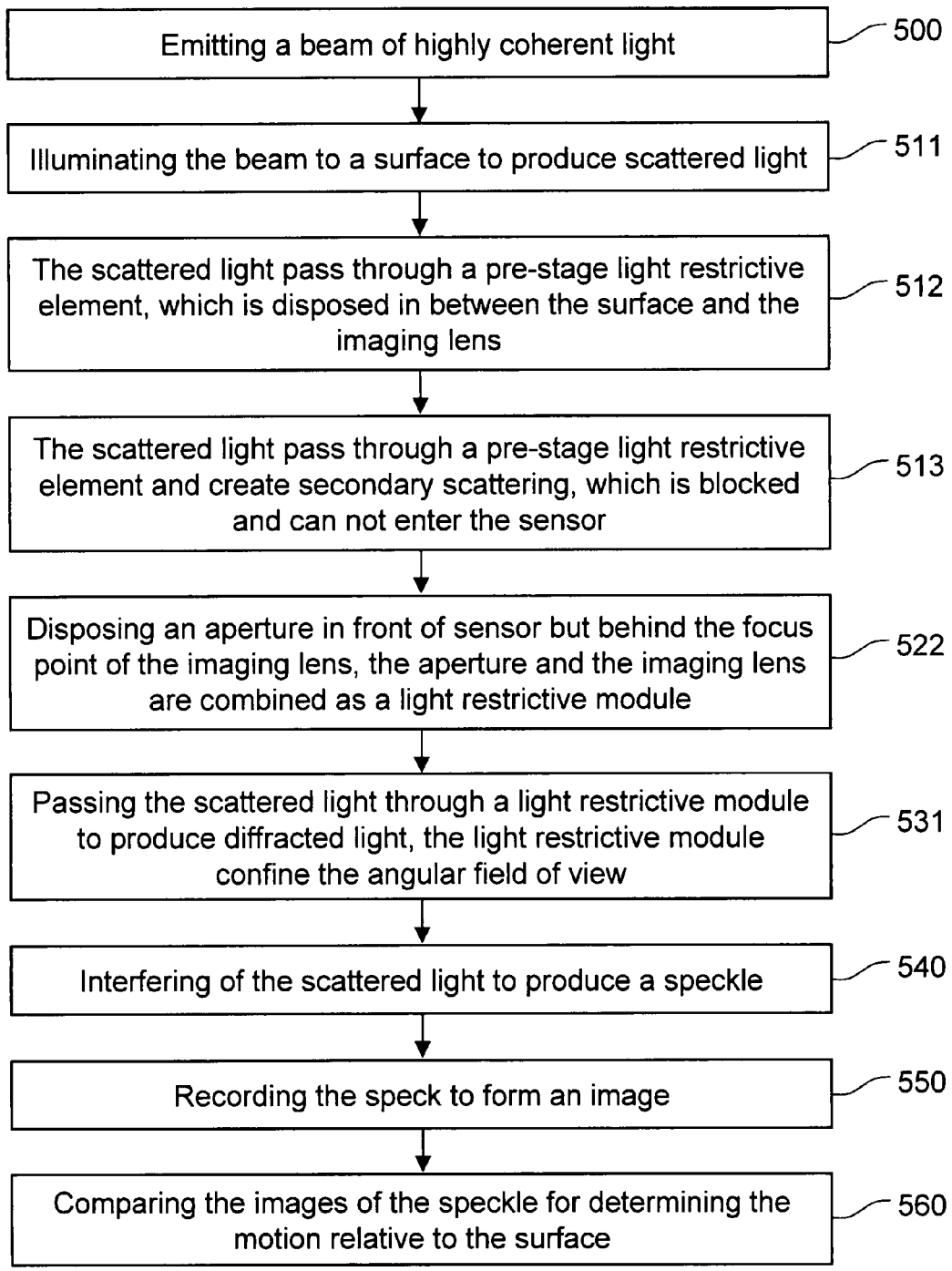

Referring to FIG. 7C, a beam of highly coherent light is emitted first (step 500). The beam of highly coherent light incidents on a surface, produce a scattered light (step 511). A pre-stage light restrictive element is disposed in between the surface and the imaging lens (step 512). The scattered light passes through the re-stage light restrictive element, incidents on the sleeve to produce secondary scattered light, the secondary scattered light will be blocked and will not received by the sensor (step 513). An aperture is disposed in between the imaging lens and the sensor, the aperture and the imaging lens comprise a light restrictive module (step 522). When the scattered light pass through the light restrictive module, the angular field of view of the sensor for the scattered light is limited by the light restrictive module, the scattered light is further diffracted by the light restrictive module (step 531). The diffracted lights interfere with each other and produce the speckle (step 540). The speckle is recorded as an image (step 550). The movement of the speckle image is recognized via pattern recognition of the images, a relative motion between the speckle capturing device and the surface can be determined (step 560).

Overall, an image invariant speckle capturing devices and method is disclosed in this invention. A light restrictive module is disposed in front of a sensor, by properly adjusting such parameters as size of speckle, focal length of imaging lens, angle of image capturing, and image capturing area on the surface, the condition that the variation of maximum optical path length difference $4\delta d \cos^3\theta_A/\gamma < \lambda/5$ will be satisfied, an image invariant speckle image can be obtained on the image plane. When there is a relative motion between the speckle capturing device and the surface, the resulted speckle will be shifted accordingly but invariant with respect to the relative motion, favorable to the precision positioning and recognition. Therefore, the image invariant speckle capturing device and method can be applied in such devices as laser mouse, finger navigator, intelligent card, three dimensional finger print identification, precision positioning device for machine tool or mechanical arm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image invariant optical speckle capturing device, comprising:

a light source, which emits a beam of highly coherent light to illuminate a surface and to produce a plurality of scattered lights;

a light restrictive module, which confines the incident angular field of view to the scattered light, and produces a plurality of diffracted lights from the scattered lights so that the diffracted lights interfere with each other to produce a plurality of speckles, wherein the light restrictive module has a optical axis arranged in the direction of $90° > \theta r \geq \theta i + 10°$ or $0° < \theta r \leq \theta i - 10°$, where $\theta r$ is the angle between the optical axis of the light restrictive module and a normal direction of the surface, and $\theta i$ is the angle between a direction of the incident light and a normal direction of the surface; and an optical sensor, which receives the speckles to generate a first speckle image, wherein a second speckle image is generated after the light restrictive module and the sensor move with respect to the surface, and the direction and distance of the motion are determined by comparing the first speckle image with the second speckle image; and a pre-stage light restrictive elements, disposed in between the light restrictive module and the surface, which blocks secondary scattered lights of the scattered lights to enter the optical sensor.

2. The image invariant optical speckle capturing device of claim 1, wherein the pre-stage light restrictive device is an aperture.

3. The image invariant speckle capturing device of claim 1, wherein the light restrictive module includes an imaging lens and an aperture, the aperture is disposed behind a focal point of the imaging lens and in front of the sensor; when the scattered lights pass through the imaging lens and the aperture of the light restrictive module to image on the sensor, the light restrictive module confine the angular field of view of the sensor to limit the scattering lights from entering the sensor.

4. The image invariant speckle capturing device of claim 1, further comprises a converge lens disposed in front of the light source to produce a collimated light and illuminate the surface.

5. The image invariant speckle capturing device of claim 1, wherein a variation of a relative optical path length difference, $4\delta d \cos^3\theta_A/\gamma$, is less than $\lambda/5$;

where $\delta$ is the average radius of optical speckle;

$\theta_A$ is the angle of image capturing between optical axis of the light restrictive module and the normal direction of the surface;

d is the diameter of the image capturing area and it is equal to the maximum movement distance during which the image is invariant, $\gamma$ is vertical separation from imaging lens to the surface; and $\lambda$ is wavelength of the light source.

6. The image invariant speckle capturing device of claim 1, wherein the light restrictive module comprises a first aperture and an imaging lens, the aperture is disposed in front of the imaging lens, and when the scattered light pass through the aperture and the imaging lens of the light restrictive module to image on the sensor, the light restrictive module restrict the scattered light from entering the sensor to confine the incident angular field of view of the sensor.

7. The image invariant speckle capturing device of claim 6, wherein the light restrictive module further comprises a second aperture disposed near the surface to confine the incident angular field of view of the sensor for receiving the scattered light, and a variation of a relative optical path length difference, $4\delta d \cos^3\theta_A/\gamma$, is less than $\lambda/5$;

where $\delta$ is the average radius of optical speckle;

$\theta_A$ is the angle of image capturing between optical axis of the light restrictive module and the normal direction of the surface;

d is the diameter of the image capturing area and it is equal to the maximum movement distance during which the image is invariant, $\gamma$ is vertical separation from imaging lens to the surface; and $\lambda$ is wavelength of the light source.

8. The image invariant speckle capturing device of claim 1, wherein the light restrictive module is a micro lens.

9. The image invariant speckle capturing device of claim 8, wherein the light restrictive module further includes an opaque plate surrounding the micro lens and blocking the unfavorable scattered light.

10. A laser mouse, comprising:

a light source, which emits a beam of highly coherent light to illuminate a surface and to produce a plurality of scattered lights;

a light restrictive module, which confines the incident angular field of view to the scattered light, and produces a plurality of diffracted lights from the scattered lights so that the diffracted lights interfere with each other to produce a plurality of speckles, wherein the light restrictive module has a optical axis arranged in the direction of $90°>\theta r \geqq \theta i+10°$ or $0°<\theta r \leqq \theta i-10°$, where $\theta r$ is the angle between the optical axis of the light restrictive module and a normal direction of the surface, and $\theta i$ is the angle between a direction of the incident light and a normal direction of the surface; and an optical sensor, which receives the speckles to generate a first speckle image wherein a second speckle image is generated after the light restrictive module and the sensor move with respect to the surface;

a pre-stage light restrictive elements, which is disposed in between the light restrictive module and the surface, which blocks a secondary scattered lights of the scattered lights to enter the optical sensor; and a processing unit, which receives the data of the first speckle image and the second speckle image, and compares the first speckle image with the second speckle image, to determine the direction and distance of the relative motion between the mouse and the surface.

11. The laser mouse of claim 10, wherein the light restrictive module includes an imaging lens and an aperture, the aperture is disposed behind a focal point of the imaging lens and in front of the sensor; when the scattered lights pass through the imaging lens and the aperture of the light restrictive module to image on the sensor, the light restrictive module confine the incident angular field of view of the sensor to limit the scattering lights from entering the sensor.

12. The laser mouse of claim 10, wherein a variation of a relative optical path length difference, $4\delta d \cos^3\theta_A/\gamma$, is less than $\lambda/5$;

where $\delta$ is the average radius of optical speckle;

$\theta_A$ is the angle of image capturing between optical axis of the light restrictive module and the normal direction of the surface;

d is the diameter of the image capturing area and it is equal to the maximum movement distance during which the image is invariant, $\gamma$ is vertical separation from imaging lens to the surface; and $\lambda$ is wavelength of the light source.

13. The laser mouse of claim 10, wherein the light restrictive module comprises an aperture and an imaging lens, the aperture is disposed in front of the imaging lens.

14. The laser mouse of claim 10, wherein the light restrictive module combines a micro lens with an opaque plate around.

15. An image invariant optical speckle capturing method, comprising:

emitting a beam of highly coherent light;

projecting the highly coherent light onto a surface to produce a plurality of scattered lights;

passing the scattered lights through a pre-stage light restrictive element to block a secondary scattered lights of the scattered lights;

passing the scattered lights through a light restrictive module to confine image captured area, and produce a plurality of diffracted lights, wherein the light restrictive module has a optical axis arranged in the direction of $90° > \theta r \geqq \theta i + 10°$ or $0° < \theta r \leqq \theta i - 10°$, where $\theta r$ is the angle between the optical axis of the light restrictive module and a normal direction of the surface, and $\theta i$ is the angle between a direction of the incident light and a normal direction of the surface;

interfering the diffracted lights with each other to produce a plurality of speckles; and recording the speckles to create an image.

16. The image invariant optical speckle capturing method of claim 15, further comprises a step of comparing the images for monitoring the movement of the speckles to decide of the motion with respect to a surface.

17. The image invariant optical speckle capturing method of claim 15, wherein the light restrictive module includes an imaging lens and an aperture, the aperture is disposed behind a focal point of the imaging lens and in front of the sensor; when the scattered lights pass through the imaging lens and the aperture of the light restrictive module to image on a sensor, the light restrictive module confine the angular field of view of the sensor to limit the scattering lights from entering the sensor.

18. The image invariant optical speckle capturing method of claim 15, wherein the light restrictive module is used to limit a variation of relative optical path length difference, $4\delta d \cos^3\theta_A/\gamma$, is less than $\lambda/5$;

where $\delta$ is the average radius of optical speckle;

$\theta_A$ is the angle of image capturing between optical axis of the light restrictive module and the normal direction of the surface;

d is the diameter of the image capturing area and it is equal to the maximum movement distance during which the image is invariant;

$\gamma$ is vertical separation from imaging lens to the surface; and $\lambda$ is wavelength of the light source.

* * * * *